Figure 1:
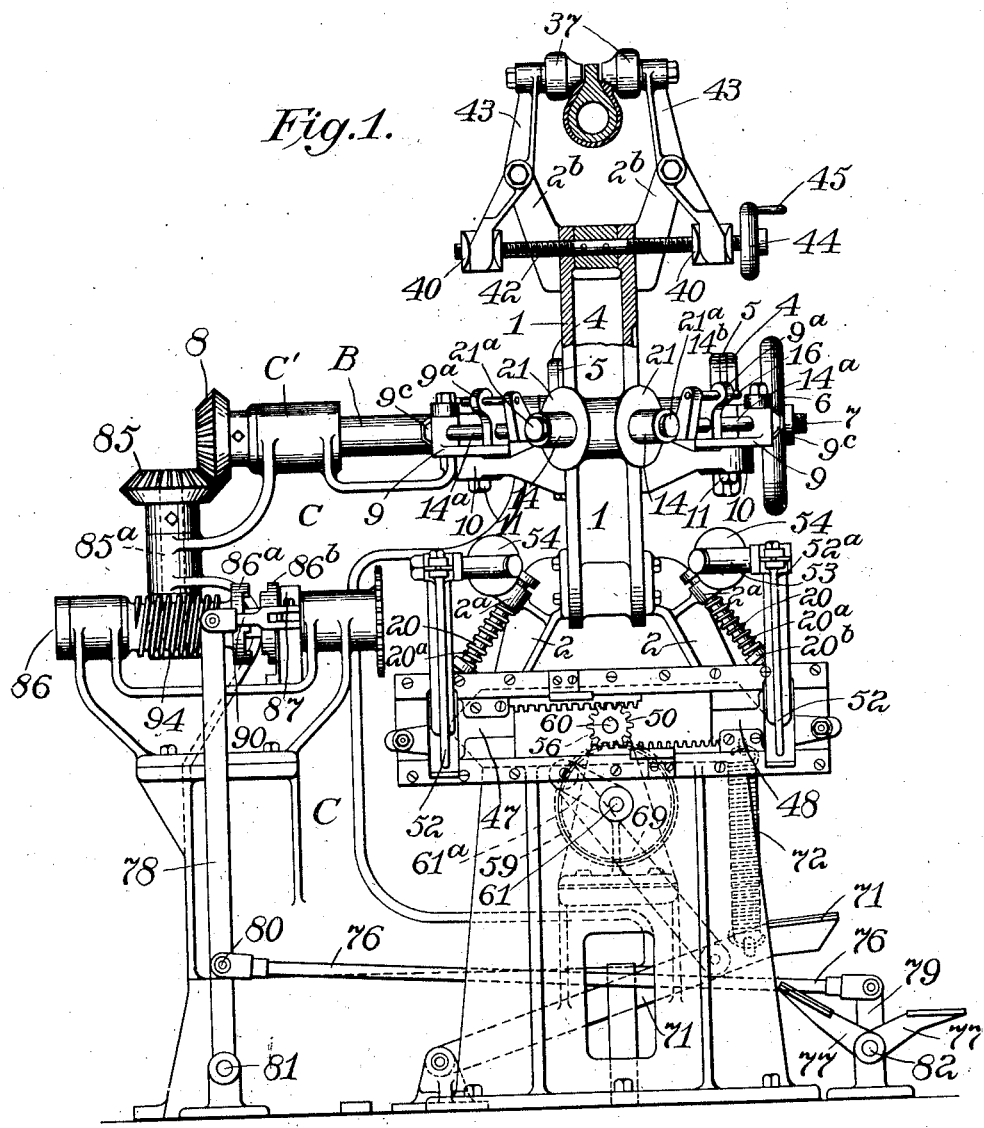

R. GRIFFITH.
TIRE STITCHING MACHINE.
APPLICATION FILED MAR. 9, 1916.

1,212,207.

Patented Jan. 16, 1917.
4 SHEETS—SHEET 1.

Inventor:
Richard Griffith,
by Spear, Middleton, Donaldson & Spear
Atty's.

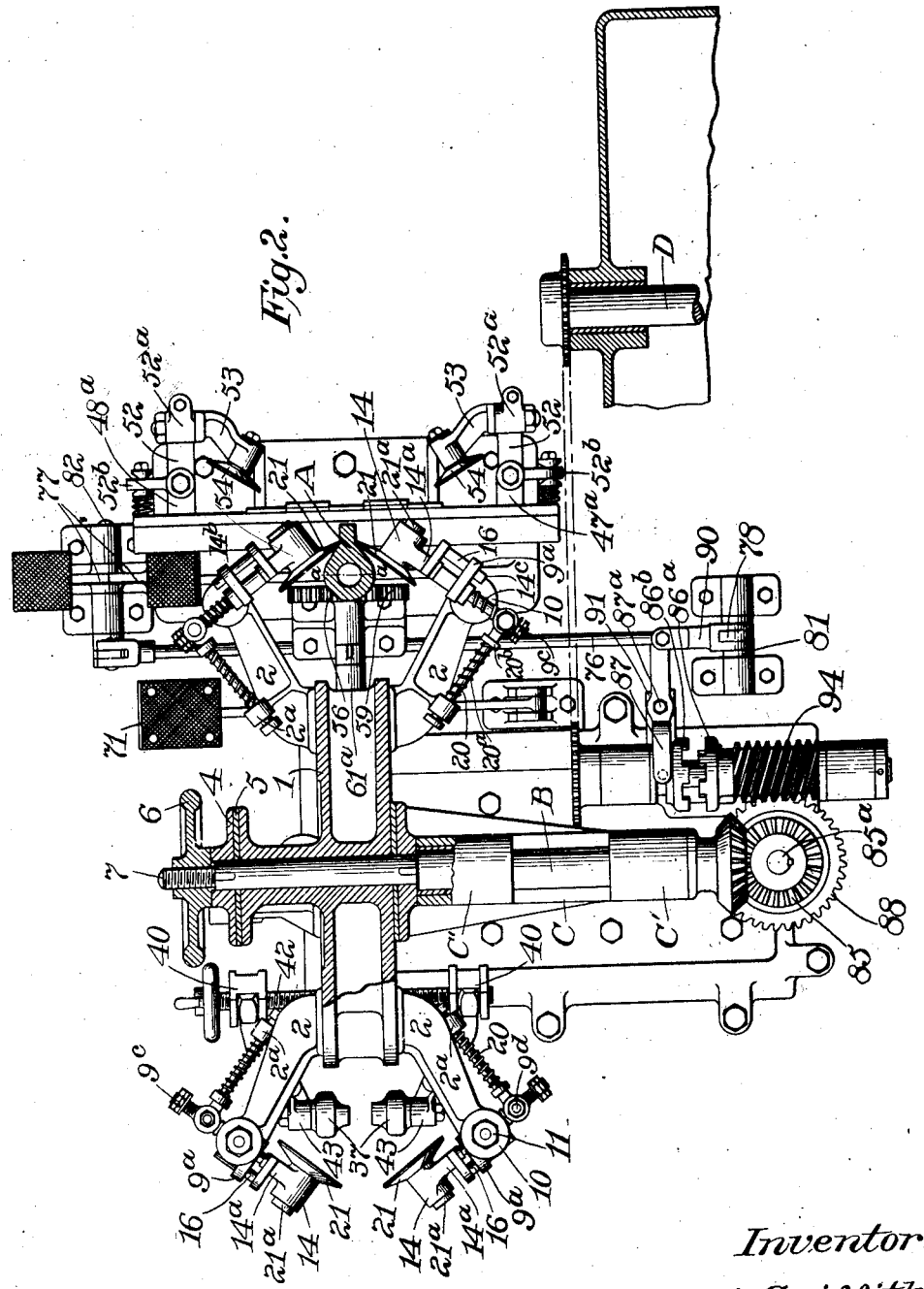

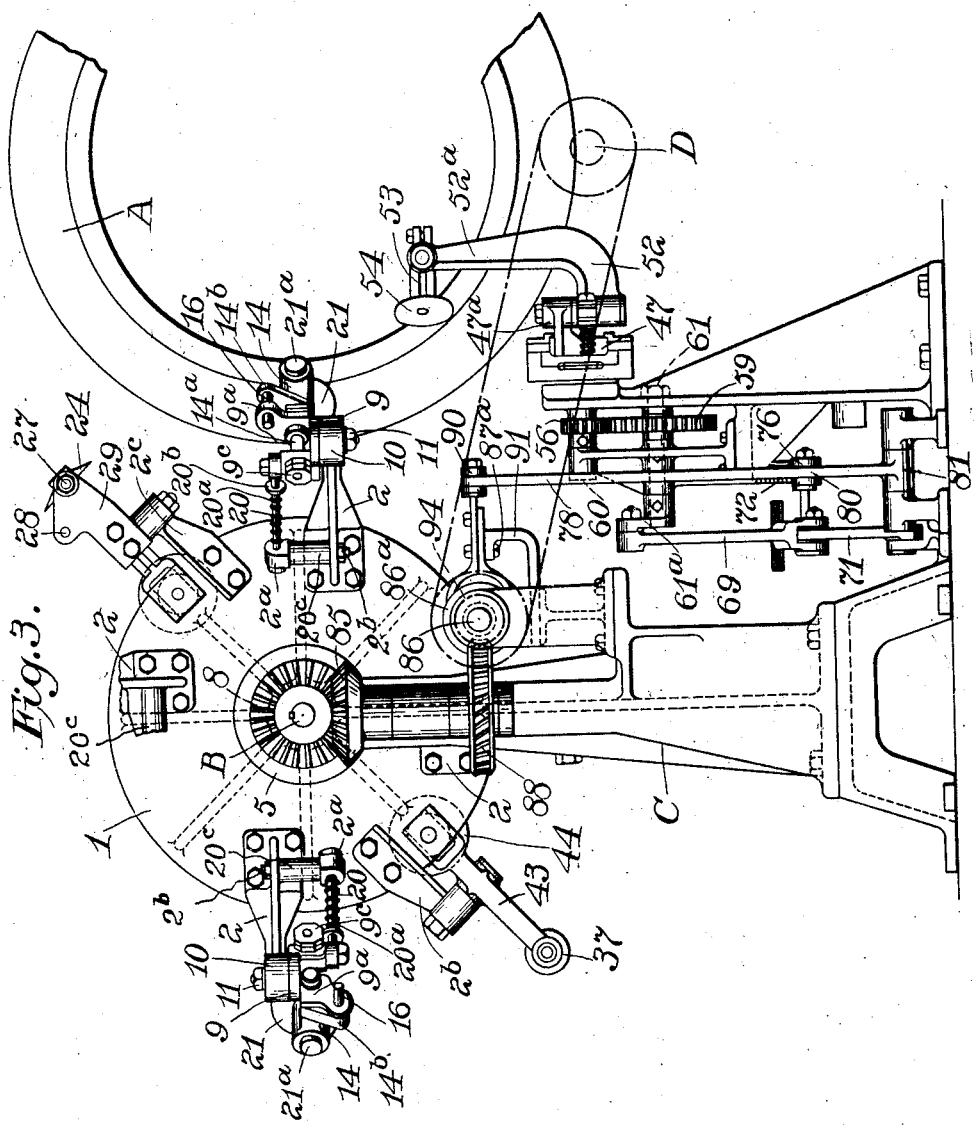

R. GRIFFITH.
TIRE STITCHING MACHINE.
APPLICATION FILED MAR. 9, 1916.
1,212,207.
Patented Jan. 16, 1917.
4 SHEETS—SHEET 4.
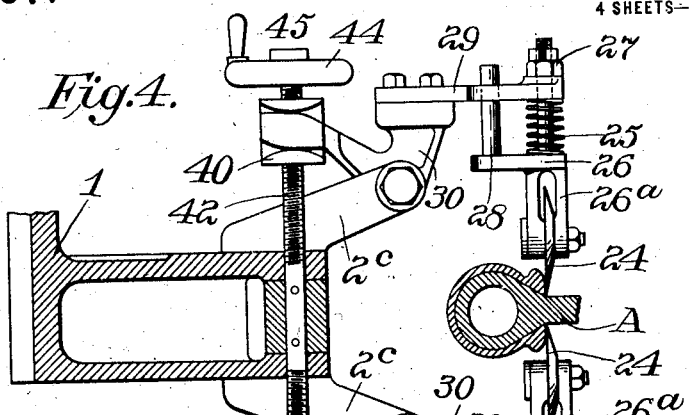
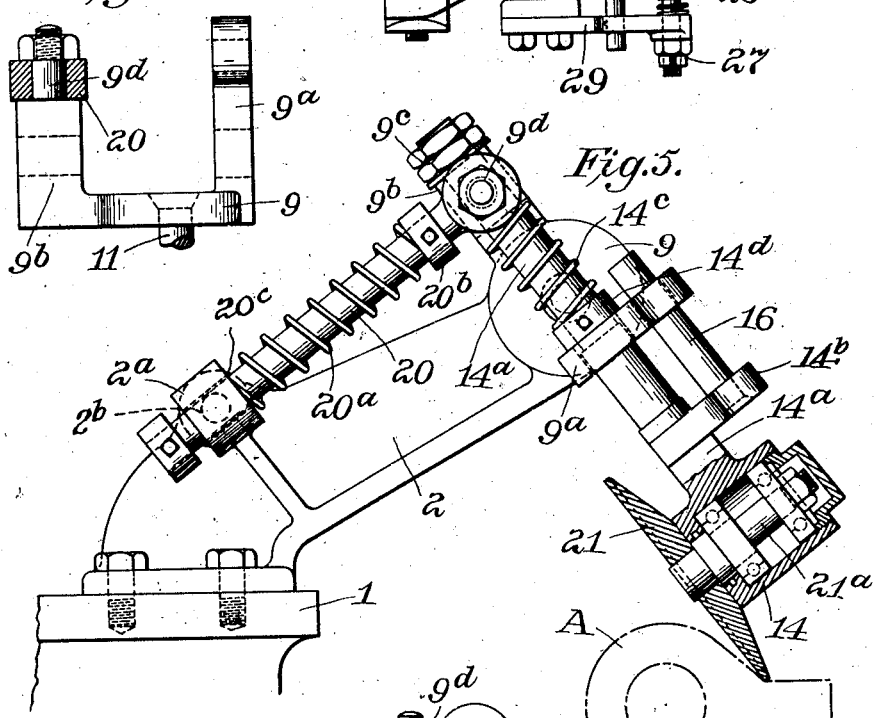
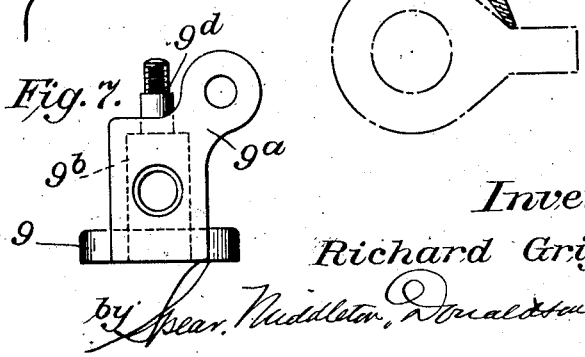
Inventor:
Richard Griffith,
by Spear, Middleton, Donaldson & Spear
Attys.

UNITED STATES PATENT OFFICE.

RICHARD GRIFFITH, OF AKRON, OHIO, ASSIGNOR TO THE MILLER RUBBER COMPANY, OF AKRON, OHIO, A CORPORATION OF OHIO.

TIRE-STITCHING MACHINE.

1,212,207.  Specification of Letters Patent.  Patented Jan. 16, 1917.

Application filed March 9, 1916.  Serial No. 83,209.

*To all whom it may concern:*

Be it known that I, RICHARD GRIFFITH, a citizen of the United States, residing at Akron, Ohio, have invented certain new and useful Improvements in Tire-Stitching Machines, of which the following is a specification.

My present invention relates to improvements in machines or apparatus for applying or "stitching" tire forming material onto cores or mandrels.

Heretofore, so far as I am aware, it has been customary to feed the material in strip form to a revoluble core and to perform the shaping or stitching of the fabric down around the sides of the core by a device movable radially of the core, and propelled either by hand, or by power controlled by hand.

One of the objects of the present machine is to devise a construction which will not require such radial movement with its manual control, thereby making the machine more nearly automatic.

Other objects are to provide apparatus capable of more rapid operation, and more efficient results, and including also various desirable features as will hereinafter appear.

With such objects in view, the invention includes the novel features of construction and arrangement and combination of parts as defined by the appended claims, an embodiment of the invention being described in the following specification with reference to the accompanying drawings, in which—

Figure 1 is a side elevation of such a machine. Fig. 2 is a plan view of the same. Fig. 3 is a front elevation. Fig. 4 is a detail view in sectional plan of the trimming means. Fig. 5 is an enlarged detail view, partly in section, showing one of the stitching wheels and its supporting means. Figs. 6 and 7 are detail views, taken at right angles, of the supporting plates 9.

Referring by reference characters to these drawings, A designates a revoluble core or mandrel which is intended to be representative of any ordinary or improved form of core. It may be supported in any suitable manner and power driven by any desired means, but as these, *per se*, form no part of the present invention, illustration and description thereof is deemed unnecessary. Associated with such revoluble core is a rotatable carrier or turret 1 journaled to rotate in the plane of the core upon a stationary axis. It will be understood that the material of which the tire carcass is built, is fed to the core under proper tension from any suitable source of supply, not shown, and will be caused by such tension to adhere to the surface of the core, or the underlying plies back to about the medium line indicated at $a-a$, Fig. 2.

For shaping or stitching the material to the core for the remaining distance, I provide, upon the rotatable turret or carrier, a plurality of shaping or stitching devices adapted to be brought successively into coöperative relation to the core and to act progressively upon the tire forming material fed thereto.

It will be understood that the core will be driven much more rapidly than the carrier or turret and that each successive shaping device, as it comes into operative position, will act to shape or stitch the material farther around the sides of the core until the last stitcher of the series has been reached when the operation, so far as an individual ply is concerned, is complete, the said shaping devices repeating their cycle of operations on each successive ply.

The shaping or stitching devices carried by the turret are duplicates of each other, so that a description of one pair will suffice for all, the only difference being that each succeeding pair is set or adjusted to act slightly farther than the preceding pair. In other words, each succeeding pair of stitchers takes up the work at a point slightly short of the termination of the work of the preceding pair and carries it a step farther.

The shaping or stitching devices are shown as supported from the carrier by pairs of diverging arms 2, and are preferably in the form of disks or rollers 21 having stud shafts $21^a$ journaled in bearing members 14, (preferably on ball bearings) and held in position by nuts 17. These bearing members 14 are formed on or secured to the ends of rods $14^a$, which pass through openings in lugs or brackets $9^a$ carried by plates or disks 9. These latter are rotatably connected to bosses 10 on arms 2 by bolts 11. The bolts $14^a$ carry lugs $14^b$ from which project pins 16, which pass through openings in the lugs $9^a$, whereby the rods $14^a$ are held against rotation. Each disk 9 carries an upstanding post $9^b$ opposite the lugs 9ª, which has an opening to receive the end of rod 14ª, said end being threaded to carry holding nuts 9ᶜ.

Each upstanding portion or lug 9ᵇ has a cylindrical portion 9ᵈ which is engaged by the eye of an eye bolt 20, the other end of which passes through the eye of a lug 2ª carried by the end of a bolt 2ᵇ, which bolt is supported in the opening formed in a lug 20ᶜ, on the bracket 2. Encircling each eye bolt 20 is a spring 20ª which bears at one end against said lug 2ª, and at the other against a collar 20ᵇ secured to the rod. Thus on contact of the disks 21 with the core or material thereon, any undue resistance, due to irregularities in the fabric or any wabbling of the core, will cause the arms 14 to rock on pivots 11 against the tension of springs 20ª. I also arrange the disk mountings so that said disks can recede under spring pressure in the planes of the disks, this being accomplished by the rods 14ª being slidably held in the lugs 9ª and 9ᵇ and being encircled by springs 14ᶜ, which bear against the lugs 9ᵇ at one end and at the other end against collars 14ᵈ on the rods 14ª.

The carrier 1 is removably clamped to a drive shaft B between clamping collars 4 and friction disks 5, the necessary clamping effect being secured by hand wheel 6 having its hub screwed onto the threaded extension 7 of shaft B. Said shaft is journaled in suitable bearings C′ of the main frame C and derives its motion through bevel gears 8 and 85, vertical shaft 85ª and worm wheel 88 fast on said shaft and meshing with worm 94 loose on drive shaft 86. Said drive shaft 86 is driven from any suitable source of power, such as motor shaft D through driving connections, shown as chain and sprockets. Splined on shaft 86 is a movable clutch member 86ᵇ and a corresponding clutch member 86ª is connected with worm 94.

Clutch member 86ᵇ can be shifted to connect or disconnect worm 94 with drive shaft 86 by forked lever 87 pivoted at 87ª to supporting bracket 91 and having its outer end connected by link 90 with a vertical lever 78 having its lower end pivoted at 81 and having an intermediate portion, indicated at 80, connected by rod 76 with an arm 79 on a rock shaft 82, in convenient reach of the operator. Means are provided to enable the operator to rock said shaft to shift the movable clutch member, and such means may take the form of a pair of treadle arms 77 extending in opposite directions. Thus by pressure of the foot of the operator on one of the treadle arms, the carrier may be started to rotating, thereby causing the pairs of stitchers to be successively brought into operative relation to the core, and after the carrier has made a complete rotation, pressure on the other treadle disconnects it from the power shaft. It is desirable in machines of this character, that means shall be provided for applying bead rings after a certain number of plies of material have been stitched upon the core. To provide for this, I secure to the carrier, at a convenient point between certain of the pairs of stitching devices, arms 2ᵇ to which are pivoted levers 43, upon the outer ends of which are journaled bead ring applying rollers 37. The inner ends of these arms engage recesses in nuts or blocks 40, which are carried by threaded rod 42 rotatably supported by the carrier 1. A wheel 44, fast on one end of this rod, carries a handle 45 by which the rod may be rotated, whereby the nuts 40 may be caused to approach or recede from each other, due to the portions of the rod on opposite sides of the carrier being reversely threaded. During the stitching operation the hand wheel would be operated to rock the arms so as to separate the rolls 37 sufficiently to permit them to pass freely by the sides of the core. When the bead rings are to be applied, the carrier is adjusted or rotated (which may be done by hand, the power being disconnected) to bring the bead ring applying rolls 37 into proper position, (which would be in direct line between the axis of the core and the axis of the carrier, such as occupied by stitchers 21, Fig. 1), and the carrier then being at rest, the hand wheel is rotated to rock the arms to cause the rolls 37 to be brought into bead-ring applying position, see Fig. 3. Thereafter the bead rings, being fed in between the rotating core and the rolls 37, will be properly positioned and pressed against the core, the degree of pressure being determined by the adjustment of the arms.

It is also desirable that means shall be provided for trimming the edges of the applied layers. Such means may take the form shown more in detail in Fig. 4, wherein is shown a pair of arms 2ᶜ secured at a convenient point to the carrier. To the outer ends of these arms are pivoted levers 30, the inner ends of which rest in recesses in nuts or threaded blocks 40 engaging the reversely threaded portions of rod 42. This rod is rotatably supported by the carrier and is provided at one end with wheel 44 having handle 45. Plates or bars 29 secured to the outer ends of the levers 30 have each a pair of apertures in which are slidingly held the rods 27 and 28 carried by plates or members 26, which members have forked portions 26ª. Between the arms of such forked portions are journaled cutting disks 24. When the plies or layers are to be trimmed, the cutters, (which during the stitching operation have been separated a distance greater than the thickness of the core, so as to be ineffective) are first brought by the rotation of the carrier into the position occupied by stitchers 21, Fig. 1. Rod 42 is then rotated to bring the cutting disks 24 into operative position to effect the trimming of the plies, as indicated in Fig. 4, which trimming is effected by the rolling contact of the cutters on the material carried by the revolving core, the requisite pressure being applied by the adjustment of the rod, and the knives being allowed to yield when necessary, by reason of the springs 25 encircling the rods 27.

The machine, as thus far described, is adapted to lay or stitch the plies on the core and under the bead rings, to apply the bead rings, and to stitch other layers down to the bead rings. After this has been done and before the layers are trimmed, the outer layers or plies require to be stitched over the bead rings. To enable this to be done, I provide a pair of stitching wheels or disks 54 rotatably carried by arms 53 adjustably secured to the upstanding arms 52ª of bell crank levers 52, which are pivoted to lugs 47ª and 48ª carried by slides 47 and 48. These slides are mounted to reciprocate transversely of the plane of the core, and are provided with opposed racks which engage on opposite sides with the teeth of a gear wheel 50. This gear wheel is fast on a shaft 60, which shaft carries another gear 56 which meshes with a gear 59. This last named gear is fast on crank shaft 61, the crank 61ª of which is connected by pitman 69 with treadle lever 71, which latter is normally held elevated by spring 72. Pressure on the treadle lever, through the connections above described, causes the stitching wheels 54 to move toward the core and engage the fabric and stitch the same down around the bead rings.

Having thus described my invention what I claim is:

1. An apparatus of the class described comprising a rotatable core, a carrier associated therewith and rotatable about an axis parallel to the axis of said core, and stitching means carried by said carrier.

2. Apparatus of the class described comprising a rotatable core, a carrier associated therewith and rotatable about an axis parallel with the axis of said core, and a plurality of pairs of stitching devices carried by said carrier.

3. Apparatus of the class described comprising a rotatable core, a rotatable carrier associated therewith, and a plurality of pairs of stitching devices carried by said carrier and arranged to act at different distances from the axis of the carrier.

4. Apparatus of the class described comprising a rotatable core, a carrier associated therewith and rotatable about an axis parallel to the axis of said core, and a plurality of pairs of stitching devices carried by said carrier, and bead placing devices supported from said carrier.

5. Apparatus of the class described comprising a rotatable core, a carrier associated therewith and rotatable about an axis parallel to the axis of said core, and a plurality of pairs of stitching devices carried by said carrier, and trimming means carried by said carrier.

6. Apparatus of the class described comprising a rotatable core, a carrier associated therewith and rotatable about an axis parallel with the axis of said core, and a plurality of pairs of stitching devices carried by said carrier and adapted during its rotation to act progressively over the face of the core.

7. Apparatus of the class described comprising a rotatable core, a rotatable carrier associated therewith, a plurality of pairs of stitching devices carried by said carrier, means for rotating said carrier to cause said devices to successively act upon the material on the core, means for disconnecting said carrier from its source of power, and other devices carried by said carrier for coöperating with the material on the core while the carrier is stationary.

8. Apparatus of the class described comprising a rotatable core, a rotatable carrier associated therewith, power driven means for slowly rotating said core, means for disconnecting said power to permit the carrier to be stationary in any desired position, stitching devices on said carrier rendered effective by the rotation of the carrier and bead applying devices on the carrier with means for rendering them operative while the carrier is stationary.

9. Apparatus of the class described comprising a rotatable core, a rotatable carrier associated therewith, power driven means for slowly rotating said core, means for disconnecting said power to permit the carrier to be stationary, in any desired position, stitching devices on said carrier brought into operative relation to the core by the rotation of the carrier, and trimming devices on the carrier with means for rendering them operative while the carrier is stationary.

10. Apparatus of the class described comprising a rotatable core, a rotatable carrier, a device on said carrier brought into operative relation to the core by the rotation of the carrier for shaping material about the core, stitching the tire material under and to the beads, and stitching devices independent of said carrier for stitching the material around the beads.

11. Apparatus of the class described comprising a rotatable core, and a plurality of pairs of stitching devices, moving in paths which intersect said core at progressively decreasing distances from the axis of the core, and means for successively bringing said stitching devices into contact with the core during its rotation.

12. Apparatus of the class described comprising a rotatable core, a rotatable turret, a plurality of pairs of diverging arms carried by said turret, and a plurality of pairs of stitching devices yieldably carried by said arms.

13. In a tire building machine, a pivoted member, a stitcher carrying element, a stitching disk rotatably mounted on said element, said element being carried by said member to have reciprocating movement perpendicular to the axis of said disk, spring means acting on said slidable element, and means tending to rock said pivoted member.

14. Means for supporting stitching disks in tire building machines comprising a suitable support, a plate pivoted thereon having projecting lugs on opposite sides of its pivot, a rod slidably guided in said lugs and carrying a stitching device, a spring exerting tension on said rod, a second rod having one end pivotally connected to one of said lugs and its other end slidable in a suitable guide, and a spring exerting pressure on said second rod.

15. Apparatus of the class described comprising a rotatable core, a drive shaft disposed parallel with the axis of the core and having a free end, a carrier removably supported on said free end, and a plurality of pairs of stitching devices carried by said carrier.

16. Apparatus of the class described comprising a rotatable core, a drive shaft disposed parallel with the axis of the core, a carrier removably supported by said drive shaft, and a plurality of stitching devices supported from said carrier.

17. Apparatus of the class described comprising a rotatable core, a drive shaft disposed parallel to the axis of the core, a carrier loose on the drive shaft, friction means for clamping the carrier to the drive shaft, a plurality of devices supported from the carrier for coöperating with the core, and means for connecting and disconnecting said drive shaft with a source of power at will.

In testimony whereof, I affix my signature in presence of two witnesses.

RICHARD GRIFFITH.

Witnesses:
  C. O. WOLF,
  M. D. MASKREY.